(12) United States Patent
Hassan et al.

(10) Patent No.: US 9,288,681 B2
(45) Date of Patent: Mar. 15, 2016

(54) WHITE SPACE UTILIZATION

(75) Inventors: Amer A. Hassan, Kirkland, WA (US);
Daniel A. Reed, Redmond, WA (US);
Paul W. Garnett, Albany, NY (US);
Billy Anders, Bothell, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 175 days.

(21) Appl. No.: 13/525,370

(22) Filed: Jun. 18, 2012

(65) Prior Publication Data

US 2013/0337857 A1    Dec. 19, 2013

(51) Int. Cl.
| | |
|---|---|
| *H04B 7/00* | (2006.01) |
| *H04W 16/14* | (2009.01) |
| *H04W 28/16* | (2009.01) |
| *H04W 72/04* | (2009.01) |
| *H04W 84/12* | (2009.01) |
| *H04W 88/08* | (2009.01) |

(52) U.S. Cl.
CPC .............. *H04W 16/14* (2013.01); *H04W 28/16* (2013.01); *H04W 72/044* (2013.01); *H04W 84/12* (2013.01); *H04W 88/08* (2013.01)

(58) Field of Classification Search
CPC ... H04W 16/14; H04W 84/12; H04W 72/044; H04W 72/0453
USPC .............. 455/509, 500, 517, 515, 445, 452.1, 455/450, 456.1-457, 466, 414.1-414.4, 455/422.1, 403, 426.1, 426.2, 550.1, 518, 455/519; 370/328, 329, 343, 338
See application file for complete search history.

(56) References Cited

U.S. PATENT DOCUMENTS

| | | | |
|---|---|---|---|
| 6,304,756 B1 | 10/2001 | Hebeler et al. | |
| 6,567,665 B1 | 5/2003 | Kissee | |
| 7,013,158 B1 | 3/2006 | Cook | |
| 7,876,786 B2 | 1/2011 | Bahl et al. | |
| 8,185,120 B2 | 5/2012 | Hassan et al. | |
| 8,437,790 B1 | 5/2013 | Hassan | |
| 8,467,359 B2 * | 6/2013 | McCann et al. | .............. 370/338 |

(Continued)

FOREIGN PATENT DOCUMENTS

| | | |
|---|---|---|
| CN | 1887023 A | 12/2006 |
| EP | 1740001 A1 | 1/2007 |

(Continued)

OTHER PUBLICATIONS

Min, et al., "Detection of Small-Scale Primary Users in Cognitive Radio Networks", Retrieved at <<http://ieeexplore.ieee.org/stamp/stamp.jsp?tp=&arnumber=5701689>>, Proceedings of IEEE Journal on Selected Areas in Communications, vol. 29, Issue 2, Feb. 2011, pp. 13.

(Continued)

*Primary Examiner* — Keith Ferguson
(74) *Attorney, Agent, or Firm* — Steve Wight; Sandy Swain; Micky Minhas

(57) ABSTRACT

The concepts relate to broadcasting white space utilization. One example can function as a client relative to a wireless access point that is configured to obtain authorization to utilize a radio white space frequency according to a set of constraints. The example can function as a Wi-Fi direct group owner to establish a Wi-Fi connection with a device that is not the wireless access point. This example can also transmit data over the radio white space frequency to the device in compliance with the set of constraints.

20 Claims, 5 Drawing Sheets

(56) References Cited

U.S. PATENT DOCUMENTS

| | | | |
|---|---|---|---|
| 8,483,155 B1* | 7/2013 | Banerjea et al. | 370/329 |
| 8,588,158 B2 | 11/2013 | Kim et al. | |
| 8,605,741 B2* | 12/2013 | Kim et al. | 370/431 |
| 8,767,763 B2 | 7/2014 | Kim et al. | |
| 2001/0048746 A1 | 12/2001 | Dooley | |
| 2002/0036989 A1 | 3/2002 | Payton | |
| 2002/0107709 A1 | 8/2002 | Colson et al. | |
| 2002/0107811 A1 | 8/2002 | Jain et al. | |
| 2004/0259546 A1 | 12/2004 | Balachandran et al. | |
| 2007/0275730 A1 | 11/2007 | Bienas et al. | |
| 2008/0113787 A1 | 5/2008 | Alderucci et al. | |
| 2008/0130519 A1 | 6/2008 | Bahl et al. | |
| 2009/0061892 A1 | 3/2009 | Lee et al. | |
| 2009/0083800 A1 | 3/2009 | Puthalapat et al. | |
| 2009/0144791 A1 | 6/2009 | Huffman et al. | |
| 2009/0196180 A1 | 8/2009 | Bahl et al. | |
| 2009/0247201 A1 | 10/2009 | Ye et al. | |
| 2010/0048234 A1 | 2/2010 | Singh | |
| 2010/0136994 A1 | 6/2010 | Kim et al. | |
| 2010/0309806 A1 | 12/2010 | Wu et al. | |
| 2011/0076959 A1 | 3/2011 | Selen et al. | |
| 2011/0080882 A1 | 4/2011 | Shu et al. | |
| 2011/0090887 A1 | 4/2011 | Kim et al. | |
| 2011/0096770 A1 | 4/2011 | Henry | |
| 2011/0164186 A1 | 7/2011 | Sadek et al. | |
| 2011/0164580 A1 | 7/2011 | Keon | |
| 2011/0182257 A1 | 7/2011 | Raveendran et al. | |
| 2011/0223877 A1 | 9/2011 | Tillman et al. | |
| 2011/0228666 A1 | 9/2011 | Barbieri et al. | |
| 2011/0237238 A1 | 9/2011 | Hassan et al. | |
| 2011/0264780 A1 | 10/2011 | Reunamaki et al. | |
| 2011/0287802 A1 | 11/2011 | Ma et al. | |
| 2011/0299481 A1* | 12/2011 | Kim et al. | 370/329 |
| 2011/0299509 A1 | 12/2011 | Wang et al. | |
| 2011/0306375 A1 | 12/2011 | Chandra et al. | |
| 2011/0307612 A1 | 12/2011 | Junell et al. | |
| 2011/0310865 A1 | 12/2011 | Kennedy et al. | |
| 2011/0319129 A1 | 12/2011 | Bhat et al. | |
| 2012/0052891 A1 | 3/2012 | Irnich et al. | |
| 2012/0094681 A1 | 4/2012 | Freda et al. | |
| 2012/0120892 A1 | 5/2012 | Freda et al. | |
| 2012/0122477 A1 | 5/2012 | Sadek et al. | |
| 2012/0148068 A1 | 6/2012 | Chandra et al. | |
| 2012/0182883 A1 | 7/2012 | Junell et al. | |
| 2012/0230250 A1 | 9/2012 | Kasslin et al. | |
| 2012/0238304 A1 | 9/2012 | Lambert et al. | |
| 2012/0281594 A1 | 11/2012 | Stewart et al. | |
| 2012/0300761 A1 | 11/2012 | Vasko et al. | |
| 2012/0307685 A1 | 12/2012 | Kim et al. | |
| 2013/0070605 A1 | 3/2013 | Ghosh et al. | |
| 2013/0195096 A1 | 8/2013 | Kim et al. | |
| 2013/0223357 A1 | 8/2013 | Jones et al. | |
| 2014/0066059 A1 | 3/2014 | Patil et al. | |
| 2014/0146723 A1 | 5/2014 | Chang | |

FOREIGN PATENT DOCUMENTS

| | | |
|---|---|---|
| EP | 2224771 A1 | 9/2010 |
| GB | 2477916 A | 8/2011 |
| GB | 2492967 A | 1/2013 |
| WO | 2006/117587 A1 | 11/2006 |
| WO | 2010/022156 A2 | 2/2010 |
| WO | 2010/108439 A1 | 9/2010 |
| WO | 2010108439 A1 | 9/2010 |
| WO | 2011/062722 A1 | 5/2011 |
| WO | 2011053078 A2 | 5/2011 |
| WO | 2011062722 A1 | 5/2011 |
| WO | 2012035190 A1 | 3/2012 |
| WO | 2012087694 A1 | 6/2012 |
| WO | 2012/125631 A1 | 9/2012 |
| WO | 20120125631 A1 | 9/2012 |
| WO | 2012/171456 A1 | 12/2012 |
| WO | 2012171456 A1 | 12/2012 |
| WO | 2012174152 A2 | 12/2012 |

OTHER PUBLICATIONS

Kokkinene, Heikki, "Propagating Thoughts", Retrieved at <<http://www.fairspectrum.com/propagating-thoughts>>, May 20, 2012, pp. 7.

Fatemieh, et al., "Using Classification to Protect the Integrity of Spectrum Measurements in White Space Networks", Retrieved at <<http://www.cs.illinois.edu/~moinzad1/omid/pubs/FatemiehFCG11.pdf>>,In the Proceedings of the 18th Annual Network and Distributed System Security Symposium, Feb. 2011, pp. 17.

Gurney, et al., "Geo-location Database Techniques for Incumbent Protection in the TV White Space", Retrieved at <<http://ieeexplore.ieee.org/stamp/stamp.jsp?tp=&arnumber=4658242>>, Proceedings of 3rd IEEE Symposium on New Frontiers in Dynamic Spectrum Access Networks, Oct. 14, 2008, pp. 9.

Fazeli-Dehkordy, et al., "Wide-Band Collaborative Spectrum Search Strategy for Cognitive Radio Networks", Retrieved at <<http://eeexplore.ieee.org/stamp/stamp.jsp?arnumber=05765552>>, Proceedings of IEEE Transactions on Signal Processing, vol. 59, No. 8, Aug. 2011, pp. 3903-3914.

Wang, et al., "Channel Assignment of Cooperative Spectrum Sensing in Multi-Channel Cognitive Radio Networks", Retrieved at <<http://eeexplore.ieee.org/stamp/stamp.jsp?arnumber=05962509>>,Proceedings of IEEE International Conference on Communications (ICC), 2011, Jun. 5, 2011, pp. 1-5.

"Outdoor heterogeneous ISM/TVWS VSN testbed", Retrieved at <<http://www.crew-project.eu/vsn>>,Retrieved Date: Feb. 21, 2012, pp. 3.

Shellhammer, et al., "Technical Challenges for Cognitive Radio in the TV White Space Spectrum", Retrieved at <<http://ita.ucsd.edu/workshop/09/files/paper/paper_1500.pdf>>, Information Theory and Applications Workshop, 2009, Feb. 8, 2009, pp. 323-333.

Viola, Catherine, "TV white spaces: a new option for smart grid communications?", Retrieved at <<http://www.smartgridopinions.com/article/tv-white-spaces-new-option-smart-grid-communications>>, Sep. 27, 2011, pp. 9-27.

"International Search Report & Written Opinion for PCT Patent Application No. PCT/US2013/045284", Mailed Date: Sep. 18, 2013, Filed Date: Jun. 12, 2013, 14 Pages.

"International Search Report & Written Opinion for PCT Patent Application No. PCT/US2013/058348", Mailed Date: Nov. 18, 2013, Filed Date: Sep. 6, 2013, 11 Pages.

Na, et al., "Policy-Based Dynamic Channel Selection Architecture for Cognitive Radio Networks", In Proceedings of Second International Conference on Communications and Networking in China, Aug. 22, 2007, 5 Pages.

"International Search Report & Written Opinion for PCT Patent Application No. PCT/US2014/016747", Mailed Date: Sep. 8, 2014, 9 Pages.

Marcus, et al., "Regulatory and Policy Issues—Unlicensed Cognitive Sharing of TV Spectrum: The Controversy at the Federal Communications Commission", In IEEE Communications Magazine, vol. 43 Issue 5, May 2005, pp. 24-25.

Austin, Mark, "Ofcom Consultation: Digital Dividend—Cognitive Access", In OFCOM, vol. 802 Issue No. 18, Feb. 16, 2009, 63 Pages.

"Response to International Search Report & Written Opinion" from PCT Patent Application Number: PCT/US2014/020949, Filed Oct. 6, 2014, 15 pages.

Achtzehn et al., "Deployment of a Cellular Network in the TVWS: A Case Study in a Challenging Environment," Proceedings of th ACM Workshop on Cognitive Radio Networks, Sep. 2011, pp. 7-12.

Inter Digital, "Dynamic Spectrum Management,", White Paper, Oct. 12, 2012.

Ghosh et al., "Coexistence Challenges for Heterogeneous Cognitive Wireless Networks in TV White Spaces," IEEE Wireless Communications, vol. 18, Issue 4, Aug. 25, 2011, pp. 22-31.

"Inside the Nerve Centre—Progress on TVWS Geo-Location Databases," Presentation Slideshow at TV White Spaces: A Global Momentum Towards Commercialization, Oct. 10, 2010.

(56) References Cited

OTHER PUBLICATIONS

Bogucka, et al., "Secondary spectrum trading in TV white spaces", Retrieved at <<http://ieeexplore.ieee.org/stamp/stamp.jsp?tp=&arnumber=6353691>> IEEE Communications Magazine, vol. 50, Issue. 11, Nov. 2012, pp. 9.
Feng, et al., "Database-Assisted Multi-AP Network on TV White Spaces: Architecture, Spectrum, Allocation and AP Discovery", Retrieved at <<http:??ieeexplore.ieee.org/stamp/stamp.jsp?tp=&arnumber=5936215>>, Symposium on New Frontiers in Dynamic Spectrum Access Networks, May 3, 2011, pp. 12.
"International Search Report & Written Opinion for PCT Application No. PCT/US2014/020949", Mailed Date: Jun. 6, 2014, Filed Date: Mar. 6, 2014, 11 Pages.
"Requirement for Election/Restriction", From U.S. Appl. No. 13/609,271, filed Sep. 11, 2012, Mailed: Jun. 10, 2014.
"Response to the Requirement for Election/Restriction", From U.S. Appl. No. 13/609,271, Mailed: Jun. 25, 2014.
"Non-Final Office Action", From U.S. Appl. No. 13/609,271, Mailed: Jul. 10, 2014.
"Response to the Jul. 10, 2014 Non-Final Office Action", From U.S. Appl. No. 13/609,271, Mailed: Nov. 10, 2014.
"Non-Final Office Action", From U.S. Appl. No. 13/773,660, filed Feb. 22, 2013, Mailed: Jun. 9, 2014.
"Response to the Jun. 9, 2014 Non-Final Office Action", From U.S. Appl. No. 13/773,660, Mailed: Oct. 30, 2014.
"Non-Final Office Action", From U.S. Appl. No. 13/828,622, filed Mar. 14, 2013, Mailed: Aug. 15, 2014.
"Response to Non-Final Office Action," Filed Date:Dec. 15, 2014, From U.S. Appl. No. 13/828,622, 12 pages.
"PCT Demand for International Preliminary Examination," Mailed Date: Dec. 22, 2014, From US PCT Application No. PCT/US2014/016747,14 pages.
"Demand under Article 31," From PCT Patent Application No. PCT/2014/020949, Mailed Date: Jun. 6, 2014, 15 pages.
U.S. Appl. No. 13/773,660, filed Feb. 22, 2013 by Hassan et al., 16 pages.
U.S. Appl. No. 13/828,820, filed Mar. 14, 2013 by Mitchell et al., 23 pages.
U.S. Appl. No. 13/828,622, filed Mar. 14, 2013 by Hassan et al., 23 pages.
U.S. Appl. No. 13/564,727, filed Aug. 2, 2012 by Hassan et al., 20 pages.
U.S. Appl. No. 13/609,271, filed Sep. 11, 2012 by Hassan et al., 18 pages.
Austin, Mark "Ofcom Consultation: Digital Dividend—Cognitive Access," In OFCOM, vol. 802 Issue No. 18, Feb. 16, 2009, 63 Pages.
Bogucka, et al., "Secondary spectrum trading in TV white spaces", Retrieved at <<http://ieeexplore.ieee.org/stamp/stamp.jsp?tp=&arnumber=6353691>>IEEE Communications Magazine, vol. 50, Issue. 11, Nov. 2012, 9 Pages.
Fazeli-Dehkordy, et al., "Wide-Band Collaborative Spectrum Search Strategy for Cognitive Radio Networks", Retrieved at <<http://ieeexplore.ieee.org/stamp/stamp.jsp?arnumber=05765552>>, Proceedings of IEEE Transactions on Signal Processing, vol. 59, No. 8, Aug. 2011, pp. 3903-3914.
Feng et al, "Database-Assisted Multi-AP Network on TV White Spaces: Architecture, Spectrum, Allocation and AP Discovery", Retrieved at <<http:??ieeexplore.ieee.org/stamp/stamp.jsp?tp=&arnumber=5936215>>, Symposium on New Frontiers in Dynamic Spectrum Access Networks, May 3, 2011,12 Pages.
Gurney, et al., "Geo-location Database Techniques for Incumbent Protection in the TV White Space", Retrieved at <<http://ieeexplore.ieee.org/stamp/stamp.jsp?tp=&arnumber=4658242>>, Proceedings of 3rd IEEE Symposium on New Frontiers in Dynamic Spectrum Access Networks, Oct. 14, 2008, 9 Pages.
"International Search Report & Written Opinion for PCT Application No. PCT/US2014/020951", Mailed Date: Jun. 10, 2014, Filed Date: Mar. 6, 2014, 12 Pages.

Kertulla et al., "Dimensioning of Secondary Cellular in TVWS," Proceedings of the Seventh International Conference on Cognitive Radio Oriented Wireless Networks and Communications, Jun. 18-20, 2012, pp. 190-195.
Sato et al., "TV White Spaces as Part of the Future Spectrum Landscape for Wireless Communications," ETSI Workshop on Reconfigurable Radio Systems, Dec. 12, 2012.
Simic et al., "Wi-Fi, but Not on Steroids: Performance Analysis of a Wi-Fi-Like Network Operating in TVWS under Realistic Conditions," Proceedings of the IEEE International Conference on Communications, 2012, pp. 1533-1538.
TV White Spaces: A Global Momentum towards Commercialization:, Retrieved at <<http://whitespace.i2r.a-star.edu.sg/TVWS_Workshop/Slides/8%209%2010_Inside%20the%20nerve%20Centre%20-%20COMPLETE%20SESSION.pdf>>, Oct. 10, 2012, 22 pages.
"Non-Final Office Action," Mailed Date: Jun. 9, 2014, From U.S. Appl. No. 13/773,660, filed Feb. 22, 2013, 12 pages.
"Response to the Jun. 9, 2014 Non-Final Office Action," Filed Date: Oct. 30, 2014, From U.S. Appl. No. 13/773,660, 10 pages.
"Non-Final Office Action," Mailed Date: Aug. 15, 2014, From U.S. Appl. No. 13/828,622, filed Mar. 14, 2013, 14 pages.
"Final Office Action," Mailed Date: Nov. 25, 2014, From U.S. Appl. No. 13/609,271, 5 pages.
"Requirement for Election/Restriction," Mailed Date: Jun. 10, 2014, From U.S. Appl. No. 13/609,271, filed Sep. 11, 2012, 6 pages.
"Response to the Requirement for Election/Restriction," Filed Date: Jun. 25, 2014, From U.S. Appl. No. 13/609,271, 7 pages.
"Non-Final Office Action," Mailed Date: Jul. 10, 2014, From U.S. Appl. No. 13/609,271, 11 pages.
Achtzehn et al., "Deployment of a Cellular Network in the TVWS: A Case Study in a Challenging Environment," Retrieved at <<aachen.de/fileadmin/templates/images/PublicationPdfs/2011/CoRoNet2011-Cellular-in-TV-White-Spaces.pdf, In 3rd ACM workshop on Cognitive radio networks, Sep. 19, 2011, 6 pages.
Marcus., "Regulatory and Policy Issues—Unlicensed Cognitive Sharing of TV Spectrum: The Controversy at the Federal Communications Commission," In IEEE Communications Magazine, vol. 43 Issue 5, May 2005, pp. 24-25.
International Search Report & Written Opinion, Mailed Date: Oct. 6, 2014, From PCT Patent Application No. PCT/US2014/020949,15 pages.
International Search Report & Written Opinion, Mailed Date: Sep. 8, 2014 From PCT Patent Application No. PCT/US2014/016747,15 pages.
Saeed et al., "TVBDs Coexistence by Leverage Sensing and Geo-location Database," Retrieved at <<http://ieeexplore.ieee.org/stamp/stamp.jsp?tp=&arnumber=6271147>>, International Conference on Computer and Communication Engineering, Jul. 3, 2012, 7 Pages.
"Response to the Jul. 10, 2014 Non-Final Office Action," Filed Date: Nov. 10, 2014, From U.S. Appl. No. 13/609,271, 14 pages.
"International Preliminary Report on Patentability," from PCT Patent Application No. PCT/US2014/020949, Mailed Date: Feb. 10, 2015, 7 pages.
"PCT Demand and Response to International Search Report & Written Opinion," from PCT Patent Application No. PCT/US2014/020949, Filed Oct. 6, 2014, 15 pages.
"Non-Final Office Action," from U.S. Appl. No. 13/564,727, Mailed Jan. 6, 2015, 22 pages.
"Final Office Action," from U.S. Appl. No. 13/773,660, Mailed Jan. 27, 2015, 15 pages.
"Non-Final Office Action," from U.S. Appl. No. 13/828,820, Mailed Mar. 3, 2015, 19 pages.
"Written Opinion of the International Preliminary Examining Authority," from PCT Patent Application No. PCT/US2014/016747, Mailed Date: Mar. 3, 2015, 8 pages.
"Written Opinion of the International Preliminary Examining Authority," from PCT Patent Application No. PCT/US2014/020951, Mailed Date: Feb. 16, 2015, 5 pages.
Seok, Yongho, (LG Electronics), "CC4 Comment-Resolution-Reduced Neighbor Report; 11-13-0024-02-00af-cc4-comment-resolution-reduced-neighbor report," IEEE SA Mentor; 11-13-0024-02-00AF-CC4-COMMENT-RESOLUTION-REDUCED-

(56) References Cited

OTHER PUBLICATIONS

NEIGHBOR-REPORT, IEEE-SA Mentor, Piscataway, NJ, USA, vol. 802.11af, No. 2, Jan. 14, 2013, pp. 1-5, XP068040396, [retrieved on Jan. 14, 2013].
"Final Office Action", U.S. Appl. No. 13/828,622, Mailed Mar. 24, 2015, 18 pages.
Response Filed Apr. 28, 2015 to the Final Office Action Mailed Jan. 27, 2015 for U.S. Appl. No. 13/773,660, filed Feb. 22, 2013 by Amer A. Hassan, 11 pages.
Notice of Allowance Mailed Mar. 24, 2015 from U.S. Appl. No. 13/609,271, filed Sep. 11, 2012 by Amer A. Hassan, 8 pages.
Response Filed Jun. 4, 2015 to the Non-Final Office Action Mailed Jan. 6, 2015 for U.S. Appl. No. 13/564,727 by Amer A. Hassan, 10 pages.
Response filed Jun. 4, 2015 to Non-final Office Action mailed Jan. 6, 2015 from U.S. Appl. No. 13/564,727, 10 pages.
Final Office Action mailed Jun. 19, 2015 from U.S. Appl. No. 13/564,727, 28 pages.
First Office Action and Search Report mailed Jun. 23, 2015 from China Patent Application No. 201310241494.8, 13 pages.
Response filed Jun. 19, 2015 to Non-Final Office Action mailed Mar. 3, 2015 from U.S. Appl. No. 13/828,820, 10 pages.
Demand under Article 34 filed Sep. 17, 2014, from PCT Patent Application No. PCT/US2014/020951, 16 pages.
International Preliminary Report on Patentability mailed Jun. 4, 2015 from PCT Patent Application No. PCT/US2014/020951, 10 pages.
Response filed Feb. 23, 2015 to Final Office Action mailed Nov. 25, 2014 from U.S. Appl. No. 13/609,271, 9 pages.
Notice of Allowance mailed Mar. 24, 2015 from U.S. Appl. No. 13/609,271, 8 pages.
Hassan, et al., "White Space Utilization," U.S. Appl. No. 14/738,562, 53 pages.
Preliminary Amendment filed Jun. 26, 2015 from U.S. Appl. No. 14/738,562, 8 pages.
Response filed Apr. 28, 2015 to Final Office Action mailed Jan. 27, 2015 from U.S. Appl. No. 13/773,660, 11 pages.
International Preliminary Report on Patentability mailed May 29, 2015 from PCT Patent Application No. PCT/US2014/016747, 11 pages.
Response filed Jun. 9, 2015 to Final Office Action mailed Mar. 24, 2015 from U.S. Appl. No. 13/828,622, 8 pages.
Non-Final Office Action mailed Aug. 13, 2015 from U.S. Appl. No. 13/828,622, 24 pages.
Response filed Sep. 24, 2015 to First Office Action mailed Jun. 23, 2015 from China Patent Application No. 201310241494.8, 9 pages.
Notice of Allowance mailed Aug. 28, 2015 from U.S. Appl. No. 13/773,660, 9 pages.
Final Office Action mailed Aug. 24, 2015 from U.S. Appl. No. 13/828,820, 17 pages.
Applicant-Initiated Interview Summary mailed Sep. 17, 2015 from U.S. Appl. No. 13/564,727, 3 pages.
Response filed Sep. 22, 2015 to Final Office Action mailed Jun. 19, 2015 from U.S. Appl. No. 13/564,727, 11 pages.
Supplemental Notice of Allowability mailed Sep. 25, 2015 from U.S. Appl. No. 13/773,660, 2 pages.
International Search Report mailed Nov. 18, 2013 from PCT Patent Application No. PCT/US2013/058348, 12 pages.
International Preliminary Report mailed Dec. 23, 2014 from PCT Patent Application No. PCT/US2013/045284, 9 pages.
Non-Final Office Action mailed Nov. 3, 2015 from U.S. Appl. No. 13/564,727, 25 pages.
Applicant-Initiated Interview Summary mailed Nov. 30, 2015 from U.S. Appl. No. 13/828,622, 3 pages.
Response filed Dec. 9, 2015 to the Final Office Action mailed Aug. 24, 2015 from U.S. Appl. No. 13/828,820, 11 pages.
Response filed Dec. 9, 2015 to the Non-Final Office Action mailed Aug. 13, 2015 from U.S. Appl. No. 13/828,622, 12 pages.
Notice of Allowance mailed Jan. 4, 2016 from U.S. Appl. No. 13/773,660, 20 pages.
Preliminary Amendment filed Dec. 22, 2015 from U.S Appl. No. 14/951,426, 7 pages.
Response filed Jan. 14, 2016 to Non-Final Office Action mailed Nov. 3, 2015 from U.S. Appl. No. 13/564,727, 11 pages.

\* cited by examiner

SYSTEM 100

WHITE SPACE UTILIZATION

BACKGROUND

Ever increasing numbers of wireless devices are being introduced and sold. As such, the radio frequency (RF) spectrum available for these wireless devices to communicate continues to get more and more crowded. More efficient use of the RF spectrum, and sharing under-utilized RF spectrum are very important to meet the growing number of wireless devices. One portion of the RF spectrum that is under-utilized is the portion reserved for television (TV) broadcasting. Governmental regulators divided the TV portion (and/or other portions) into a plurality of channels. However, for any given geographic region many of the channels are not utilized for TV or radio broadcasting.

Unused frequencies of the reserved TV portion of the RF spectrum can be referred to as TV white space. It is possible to utilize these TV white spaces for other uses, however, their use tends to be tightly regulated by governmental institutions (such as the Federal Communications Commission in the United States).

These governmental institutions are establishing databases that map channel or frequency utilization to geographic location. Stated another way, for a given location, the database can indicate a sub-set of frequencies that are utilized for TV broadcasting and other licensed use (such as wireless microphones in some countries) and/or a different sub-set of frequencies that are TV white spaces. Potentially, the governmental institutions may allow individual TV white space frequencies to be temporarily used for other purposes. However, any access point device (sometimes referred to as a "master") that wants to temporarily use one or more of these TV white space frequencies has to have the capability to know its own geographic location to within an accuracy acceptable by the regulators and also has to have access to the database via the Internet so that the device's location can be utilized in conjunction with the locations in the database. The device may be able to obtain authorization to utilize individual TV white space frequencies according to specific conditions or constraints. For instance, the constraints may relate to the location of the device, a duration of the authorization, and/or an allowed transmission power. Other available radio frequencies may be handled in a similar manner.

SUMMARY

The described implementations relate to radio white space utilization. As used herein, the term "radio white space" can include TV white space and/or any other radio white space. One example can interact with a wireless access point that is configured to obtain authorization to use a set of radio white space frequencies in accordance with one or more constraints. The example can obtain authorization information about the set of radio white space frequencies and the one or more constraints from the wireless access point. The example can function as a Wi-Fi direct group owner to establish Wi-Fi communication with a different device. The example can convey an individual radio white space frequency from the set of radio white space frequencies to the different device. The example can also communicate with the different device over the individual radio white space frequency in compliance with the constraints.

Another example can include memory and a processor configured to execute instructions stored on the memory. This example can also include a communication component configured to interact with a wireless access point. The communication component can request that the wireless access point obtain authorization to use one or more radio white space frequencies based on a location of the wireless access point. The communication component can also be configured to operate as a Wi-Fi direct group owner to establish Wi-Fi communication with a different device. The communication component can instruct the different device to communicate over an individual radio white space frequency.

The above listed examples are intended to provide a quick reference to aid the reader and are not intended to define the scope of the concepts described herein.

BRIEF DESCRIPTION OF THE DRAWINGS

The accompanying drawings illustrate implementations of the concepts conveyed in the present document. Features of the illustrated implementations can be more readily understood by reference to the following description taken in conjunction with the accompanying drawings. Like reference numbers in the various drawings are used wherever feasible to indicate like elements. Further, the left-most numeral of each reference number conveys the FIG. and associated discussion where the reference number is first introduced.

DETAILED DESCRIPTION

Overview

This patent relates to utilizing radio white space frequencies, and more specifically to utilization of radio white space frequencies by devices that may not otherwise have the capabilities to utilize radio white space frequencies. Such a device may have wireless capabilities, such as Wi-Fi direct capabilities. However, the device may lack the capability to determine its geographic location and/or may lack the ability to interact with regulatory databases that control radio white space frequency usage. Toward this end, the device can leverage another device that does have such capabilities in order to obtain authorization to utilize radio white space frequencies. As mentioned above, radio white space frequencies can include TV whitespace frequencies and/or other radio whitespace frequencies. As used herein a "TV white space frequency" means a frequency or frequency range that was reserved for TV broadcasting, but which is not actually used for TV broadcasting in a particular geographic region. Similarly, "radio white space frequency" means a frequency or frequency range that was reserved for TV broadcasting, for other radio broadcasting, or two way radio communications, but which is not actually used in such manner in a particular geographic region.

First System Example

Figure 1:
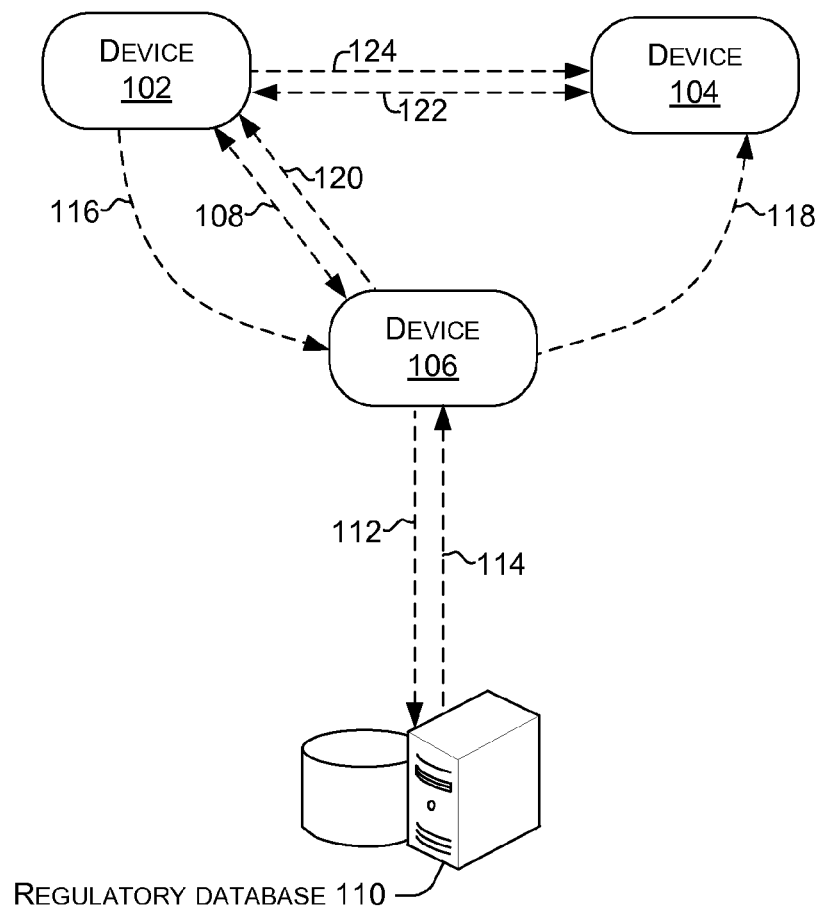
FIGS. 1-3 show examples of systems configured to utilize radio white space frequencies in accordance with some implementations of the present concepts.

For purposes of explanation consider introductory FIG. 1, which shows a system 100 where utilization of radio white space frequencies can be accomplished by devices that may not otherwise have the capabilities to utilize radio white space frequencies. This example is explained relative to TV white space frequencies but can alternatively or additionally be applied to other radio white space frequencies.

In this case, system 100 includes devices 102, 104, and 106. Assume for purposes of explanation that device 102 wants to convey data to device 104. Also, while multiple frequencies may be available to convey data from device 102 to device 104, these frequencies may be crowded (e.g., in use by other devices) and/or offer lower data transfer rates than TV frequencies. Toward this end, device 102 may want to utilize one or more TV white space frequencies to convey the data.

Assume further that devices 102 and 104 have wireless capabilities. For instance, both devices 102 and 104 can be Wi-Fi direct compliant. However, devices 102 and 104 may not have the capability to access the Internet and/or may not have the capability to determine their respective geographic locations. In contrast, device 106 can have wireless capabilities and can have the capability to access the Internet and the ability to determine its (device 106's) geographic location. In this example, device 106 can function as a wireless access point.

Device 102 can participate in a session 108 with device 106 to accomplish the goal of utilizing TV white space frequencies to convey data to device 104. In this session 108, device 106 can assume the role of the wireless access point and device 102 can assume a client role relative to the session. During the session 108, device 102 can interact with device 106 to cause device 106 to obtain authorization to use a set of TV white space frequencies in accordance with one or more constraints.

To obtain the authorization, device 106 can determine its geographic location. Device 106 can access a regulatory website or database 110. Device 106 can supply its geographic location to the regulatory database 110 and request to use one or more TV white space frequencies as indicated at 112. The regulatory database 110 can authorize use of a set of one or more available TV white space frequencies at the geographic location and a set of constraints on the use as indicated at 114. For example, the constraints may include a duration of the authorization and/or a specific transmission energy or power level which any transmissions over the frequency are not to exceed.

Now recall that one objective of this process is for device 102 to convey data to device 104 over an authorized TV white space frequency. At this point, device 102 could accomplish this objective by sending the data to device 106 as indicated at 116. Device 106 could then send the data to device 104 as indicated at 118. However, the effective data transmission rate is basically halved in that half of the data transmission rate is utilized for the communication between device 102 and device 106 and the other half between device 106 and device 104. Another option for accomplishing the objective can involve device 102 leaving session 108 with device 106 and utilizing the authorization for communicating data with other devices; in this case, device 104.

Device 102 can obtain the authorization information from device 106 as indicated at 120. Device 102 can determine its location relative to device 106 so that device 102 can operate in compliance with the constraints. Examples of techniques for determining relative location are described below relative to FIG. 3.

Device 102 can function as a group owner to establish Wi-Fi communication with device 104 as indicated at 122. During the Wi-Fi establishment, device 102 can convey an individual TV white space frequency(ies) from the set of one or more authorized TV white space frequencies over which device 102 can transmit to device 104. Device 102 can then communicate with device 104 over the individual TV white space frequency in compliance with the constraints as indicated at 124. Such a configuration can provide double the effective data transmission rate than the previous configuration where the communication is achieved via device 106.

To summarize, device 102 can act in a client role with device 106 and essentially use device 106 as a proxy to obtain TV white space authorization information that device 102 otherwise could not obtain. Device 102 can assume a host or group owner function with device 104 to indicate to device 104 what frequencies (authorized TV white space frequencies) to utilize for data communication with device 102. Thus, device 102 can indirectly obtain authorization to use one or more available TV white space frequencies (in accordance with the constraints) free from interference and with the relatively high data transfer rates offered by TV frequencies and bypass the data rate limitations involved with utilizing an intermediary device.

Second System Example

Figure 2:
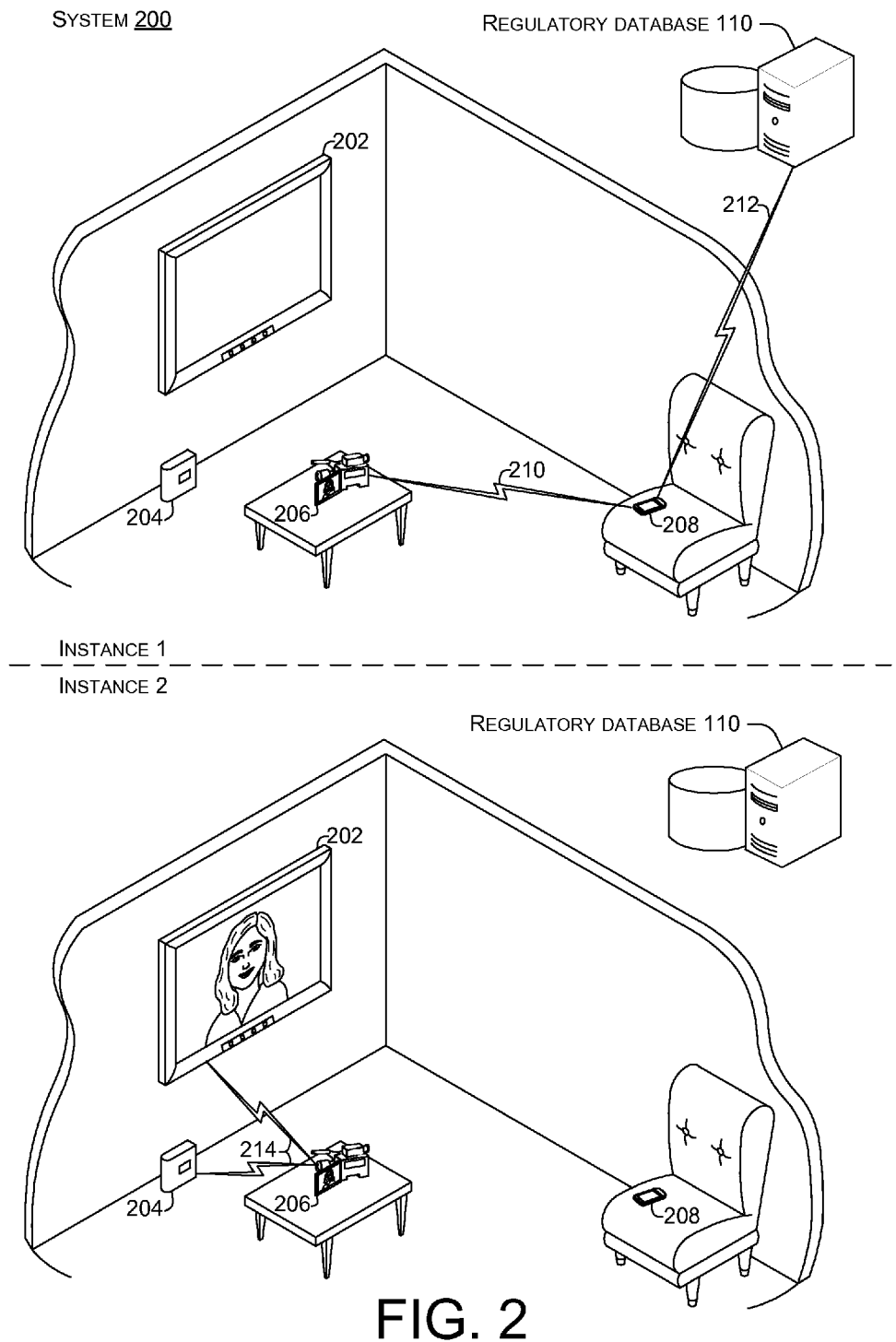

FIG. 2 shows an example environment or system 200 in which utilization of TV white space frequencies can be accomplished. For purposes of explanation, system 200 is described relative to an instance 1 and a subsequent instance 2. In this case, system 200 includes a display device 202, a hard drive back-up device 204, a video camera device 206, and a smart phone device 208. These devices can represent manifestations of the generic devices introduced above relative to FIG. 1. In this case, assume that video camera device 206 wants to communicate video data to display device 202 and hard drive back-up device 204. For instance, a user may have instructed the video camera device to communicate the video data to the display device 202 and the hard drive back-up device 204 by interacting with user interface controls on the video camera device.

In instance 1, video camera device 206 can communicate with smart phone device 208 as indicated at 210. For instance, smart phone device 208 can function as a wireless access point and the video camera device 206 can function in a client role. The video camera device 206 can cause the smart phone device 208 to access regulatory database 110 to obtain authorization to utilize TV white space frequencies subject to constraints as indicated at 212. The video camera device 206 can receive the authorization and constraints from the smart phone device 208. The video camera device 206 and/or the smart phone device 208 can select one or more frequencies of the authorized TV white space frequencies to utilize.

In instance 2, the video camera device 206 can function as a group owner to establish Wi-Fi communication with display device 202 and hard drive back-up device 204 as indicated at 214. The video camera device 206 can convey the selected frequencies to the display device 202 and hard drive back-up device 204. The video camera device 206 can transmit the video data to the display device 202 and hard drive back-up device 204. For instance, the video data can be stored by the hard drive back-up device 204 and displayed by the display device 202. This configuration can have twice the effective bandwidth compared to a configuration where the smart phone device 208 functions as a wireless access point that receives the video data from the video camera device 206 and conveys the video data to the display device 202 and hard drive back-up device 204.

Figure 3:
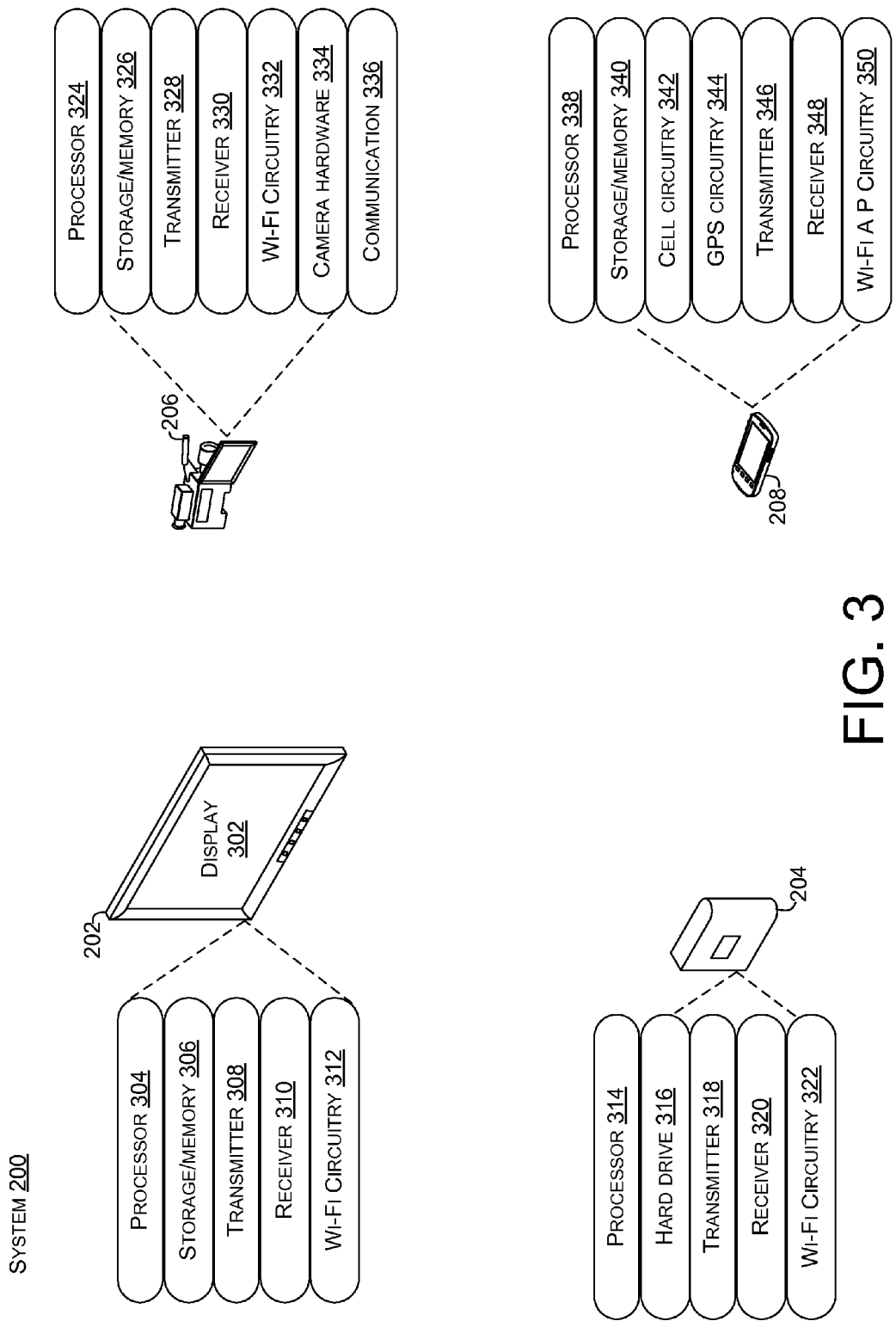

FIG. 3 shows display device 202, hard drive back-up device 204, video camera device 206, and smart phone device 208 of system 200 and introduces some of the elements or components of these devices in accordance with one implementation.

In this case, display device 202 includes a display 302, a processor 304, storage/memory 306, a transmitter 308, a receiver 310, and Wi-Fi circuitry 312. The hard drive back-up device 204 includes a processor 314, solid state or disc hard drive 316, a transmitter 318, a receiver 320, and Wi-Fi circuitry 322.

Video camera device 206 includes a processor 324, storage/memory 326, a transmitter 328, a receiver 330, Wi-Fi direct circuitry 332, camera hardware 334, and a communication component 336. Smart phone device 208 includes processor 338, storage/memory 340, cellular circuitry 342, GPS circuitry 344, a transmitter 346, a receiver 348, and Wi-Fi access point circuitry 350. Of course, individual devices can include alternative or additional components that are not described here for sake of brevity.

In relation to the display device 202 the transmitter 308 and the receiver 310 can function to transmit and receive data at various frequencies. The transmitter and the receiver can function collectively with the Wi-Fi circuitry 312 to transmit and receive data in the 2.4 Giga Hertz and 5.0 Giga Hertz bands utilized for Wi-Fi in the U.S. (other countries may utilize other frequencies). Transmitter 318 and receiver 320 can function in a similar manner relative to hard drive back-up device 204 and transmitter 328 and receiver 330 can perform a similar role for video camera device 206. Further, transmitter 346 and receiver 348 can perform a similar function for smart phone device 208 in a cooperative manner with cellular circuitry 342, GPS circuitry 344, transmitter 346, and Wi-Fi access point circuitry 350. The various transmitters and receivers can be configured to operate at specific frequencies, such as 2.4 Giga Hertz frequency, 5.0 Giga Hertz frequency, 60 Giga Hertz frequency, radio frequencies, and/or TV channel frequencies (50 Mega Hertz to 810 Mega Hertz), among others. Alternatively, the transmitters and receivers can be configured to tune to any frequencies in the RF spectrum. While discrete components or elements are illustrated, some implementations may combine elements. For instance, Wi-Fi circuitry, such as Wi-Fi circuitry 312 may include dedicated transmitters and receivers rather than interfacing with distinct transmitters and receivers.

As introduced above, an individual device, such as the video camera device 206, can interface with another device to obtain authorization to utilize available radio white space frequencies, such as TV white space frequencies with a different device. In this example, the video camera device's communication component 336 can cause communications to be established with smart phone device 208 via transmitter 328 and receiver 330 and/or Wi-Fi circuitry 332. For instance, the communication component can be configured to interact with Wi-Fi access point circuitry 350 when the smart phone device functions as a wireless access point. In such a case, the video camera device's transmitter 328 and receiver 330 can operate in cooperation with Wi-Fi access point circuitry 350 and/or transmitter 346 and receiver 348 of smart phone device 208. In another case, the communication component can utilize another wireless technology, such as Bluetooth™ to interact with smart phone device 208. Once communication is established, the communication component 336 can request that the smart phone device 208 query the regulatory database (FIGS. 1 and 2).

The smart phone device 208 can utilize its GPS circuitry 344 (or another technique such as cell tower triangulation) to determine its location. The smart phone device can access the regulatory database to obtain authorization to use one or more radio white space frequencies based on the location of the smart phone device. For instance, the smart phone can access the Internet via cellular circuitry 342. The smart phone device can then access a uniform resource identifier (URI) of the regulatory database to obtain the authorization based upon the location of the smart phone device and/or other constraints.

The video camera device's communication component 336 can obtain the authorization and accompanying information, such as the location and constraints, from the smart phone device 208. In some instances, the communication component 336 can take steps to ensure that any usage of the authorization by the video camera device complies with the constraints. For instance, the constraints may include a distance constraint on the authorization. In some cases, the distance constraint can be conveyed as a power constraint that limits the power or energy of any broadcast to a specific radius from the smart phone's location. For example, the constraint may be a power constraint such that any broadcast from the smart phone device's location over an available radio white space frequency is limited to a radius of 1,000 meters, for instance. The communication component 336 can take steps to ensure that any use by the video camera device conforms to the distance constraint. Stated another way, the communication component 336 can consider (or account for) the relative distance between the smart phone device 208 and the video camera device 206.

In one case, the communication component 336 can determine its location relative to the smart phone device 208 based upon the success or failure of its communications with the smart phone device at a given frequency and power. For instance, at 2.4 Giga Hertz, a 100 milli Watt transmission can generally be received by commercial Wi-Fi or Bluetooth compliant devices up to a range of about 100 meters. Thus, the communication component 336 can determine the video camera device's relative location to be within 100 meters of the smart phone device in an instance where the two devices are successfully communicating at this power and frequency.

Further, knowing its relative location can allow the communication component 336 to ensure that any use of the available radio white space frequencies by the video camera device complies with the authorization constraints. For example, the communication component can determine a transmission power that does not exceed 500 meters for the available radio white space frequency. Thus, if the video camera device is within 100 meters of the smart phone device and broadcasts a signal over the available radio white space frequency at a power level that is only detectable for 500 meters, then the maximum transmission distance from the authorized location (e.g., the location of the smart phone device) is less than or equal to 600 meters, which falls within the 1000 meter constraint associated with the authorization.

As mentioned above, the authorization constraints may also include a time duration. In such a case, the communication component 336 can obtain a time stamp of the authorization from the smart phone device. The communication device can then track the time from the time stamp to ensure that the duration is not exceeded. Thus, the communication component can ensure that any communications conducted by the video camera device satisfy the authorization constraints (e.g., stop before the expiration of the authorization). Further, in some implementations, the communication device can certify to the smart phone device that the authorization constraints will be followed in accordance with any use of the authorization by the video camera device.

Once the video camera device 206 obtains the authorization for available radio white space frequencies, the communication component 336 can cause the video camera device to operate as a Wi-Fi direct group owner to establish Wi-Fi communication with a different device or devices. The communication component 336 can select one or more of the available radio white space frequencies associated with the authorization. By functioning as a Wi-Fi direct group owner, the communication component can identify the selected available radio white space frequencies and instruct the different device(s) to expect communications over the selected available radio white space frequencies. The communication component can then cause the data from the storage/memory 326 to be communicated over the selected available radio white space frequencies. Thus, the video camera device is able to obtain the authorization to use available radio white space frequencies without knowing its own geographic location and/or without being able to access a regulatory database that regulates the use.

From one perspective, the video camera device 206 can communicate with the smart phone device 208 and essentially instruct the smart phone device to act as a proxy on behalf of the video camera device to obtain the authorization. The video camera device can then ensure that it (the video camera device) can utilize the available radio white space frequencies consistent with the authorization. The video camera device can finish the process without the smart phone device and can cease communications with the smart phone device. The video camera device can then select one or more of the available radio white space frequencies and identify the selected frequency(ies) to other devices with which communication can occur. In the above example, the video camera device identifies the selected frequency to the other devices (display device 202 and hard drive back-up device 204) by functioning as a Wi-Fi direct group owner. The video camera device can then communicate over the selected individual radio white space frequency in accordance with the authorization.

Display device 202, hard drive back-up device 204, video camera device 206, and smart phone device 208 can be thought of as computers or computing devices as defined to be any type of device that has some amount of processing capability and/or storage capability. Processing capability can be provided by one or more processors that can execute data in the form of computer-readable instructions to provide a functionality. Data, such as computer-readable instructions, can be stored on storage/memory. The storage/memory can be internal and/or external to the computer. The storage/memory can include any one or more of volatile or non-volatile memory, hard drives, flash storage devices, and/or optical storage devices (e.g., CDs, DVDs etc.), among others. As used herein, the term "computer-readable media" can include transitory and non-transitory instructions. In contrast, the term "computer-readable storage media" excludes transitory instances and signals. Computer-readable storage media can include "computer-readable storage devices". Examples of computer-readable storage devices include volatile storage media, such as RAM, and non-volatile storage media, such as hard drives, optical discs, and flash memory, among others.

In the illustrated implementation, display device 202, hard drive back-up device 204, video camera device 206, and smart phone device 208 are configured with general purpose processors and storage/memory. In some configurations, such devices can include a system on a chip (SOC) type design. In such a case, functionalities can be integrated on a single SOC or multiple coupled SOCs. In one such example, the video camera device can include shared resources and dedicated resources. An interface(s) can facilitate communication between the shared resources and the dedicated resources. As the name implies, dedicated resources can be thought of as including individual portions that are dedicated to achieving specific functionalities. For instance, in this example, the dedicated resources can include any of transmitter 328, receiver 330, Wi-Fi circuitry 332, and/or communication component 336.

Shared resources can be storage, processing units, etc. that can be used by multiple functionalities. In this example, the shared resources can include the processor and/or storage/memory. In one case, communication component 336 can be implemented as dedicated resources. In other configurations, this component can be implemented on the shared resources and/or the processor can be implemented on the dedicated resources.

In some configurations, the communication component 336 can be installed during manufacture of the video camera device or by an intermediary that prepares the video camera device 206 for sale to the end user. In other instances, the end user may install the communication component 336, such as in the form of a downloadable application or from a USB thumb drive, among others.

First Method Example

Figure 4:
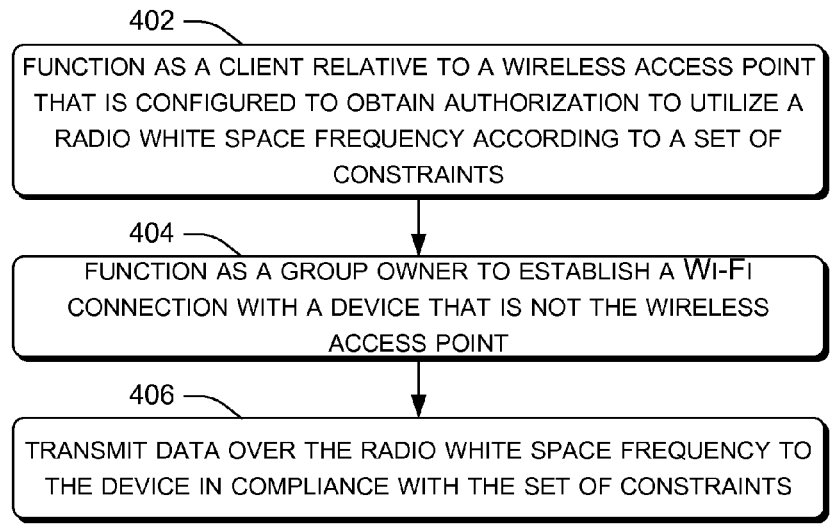
FIGS. 4-5 are flowcharts of examples of radio white space frequency utilization techniques in accordance with some implementations of the present concepts.

FIG. 4 shows a method 400 for utilization of radio white space frequencies.

The method can entail functioning as a client relative to a wireless access point that is configured to obtain authorization to utilize a radio white space frequency according to a set of constraints at 402.

The method can also entail functioning as a group owner to establish a Wi-Fi connection with a device that is not the wireless access point at 404.

The method can include transmitting data over the radio white space frequency to the device in compliance with the set of constraints at 406.

In summary, the method can allow a device to utilize another device as a proxy to obtain an authorization to utilize radio white space frequencies subject to constraints. The device can then discard the proxy and utilize some of the authorized radio white space frequencies for other purposes while complying with the constraints. The method can be useful in instances where the device could not otherwise obtain the authorization on its own. The method can also provide a higher effective data transfer rate to the device than a configuration where the proxy used the authorization and the device communicated data through the proxy to other devices.

Second Method Example

Figure 5:
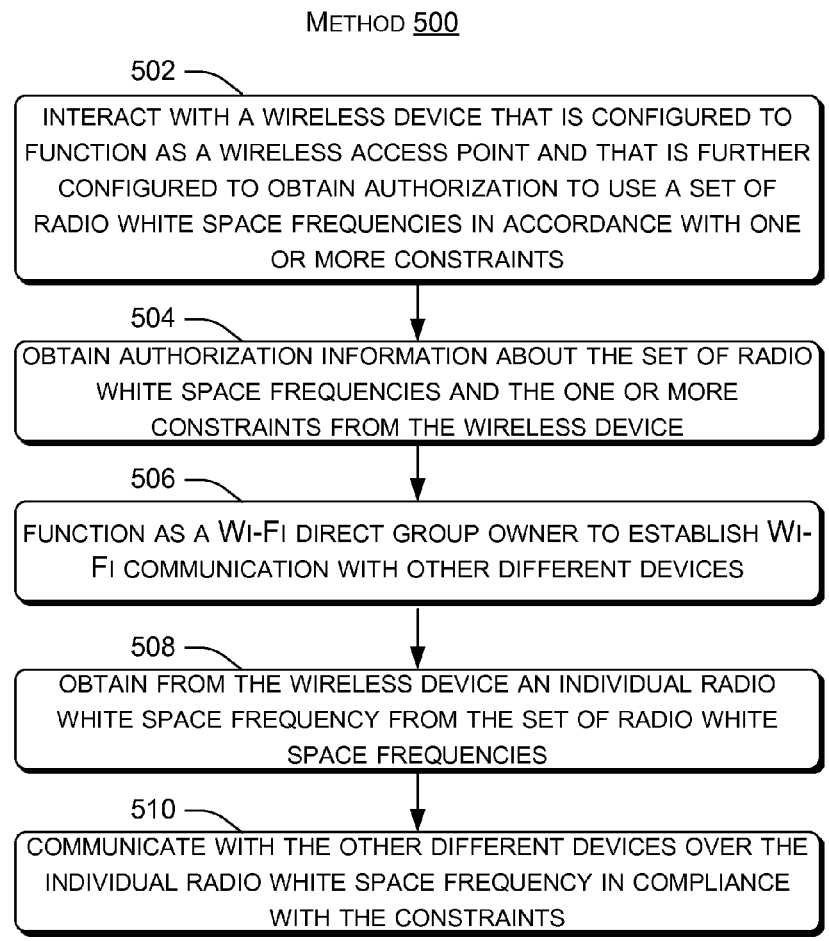

FIG. 5 shows a method 500 for utilization of radio white space frequencies.

The method can include interacting with a wireless device that is configured to function as a wireless access point and that is further configured to obtain authorization to use a set of radio white space frequencies in accordance with one or more constraints at 502.

The method can entail obtaining authorization information about the set of radio white space frequencies and the one or more constraints from the wireless device at 504.

The method can include functioning as a Wi-Fi direct group owner to establish Wi-Fi communication with other different devices at 506.

The method can include obtaining from the wireless device an individual radio white space frequency from the set of radio white space frequencies at 508.

The method can also include communicating with the other different devices over the individual radio white space frequency in compliance with the constraints at 510.

The order in which the example methods are described is not intended to be construed as a limitation, and any number of the described blocks or acts can be combined in any order to implement the methods, or alternate methods. Furthermore, the methods can be implemented in any suitable hardware, software, firmware, or combination thereof, such that a computing device can implement the method. In one case, the method is stored on one or more computer-readable storage media as a set of instructions such that execution by a processor of a computing device causes the computing device to perform the method.

CONCLUSION

Although techniques, methods, devices, systems, etc., pertaining to utilization of radio white space frequencies are described in language specific to structural features and/or methodological acts, it is to be understood that the subject matter defined in the appended claims is not necessarily limited to the specific features or acts described. Rather, the specific features and acts are disclosed as exemplary forms of implementing the claimed methods, devices, systems, etc.

The invention claimed is:

1. A method, comprising:
    interacting with a wireless device that is configured to function as a wireless access point and that is further configured to obtain authorization to use a set of radio white space frequencies in accordance with one or more constraints including a distance constraint, the wireless device obtaining authorization on behalf of another device that lacks ability to obtain authorization to use the set of radio white space frequencies;
    obtaining authorization information about the set of radio white space frequencies and the one or more constraints from the wireless device;
    functioning as a Wi-Fi direct group owner to establish Wi-Fi communication with other different devices;
    obtaining from the wireless device an individual radio white space frequency from the set of radio white space frequencies;
    estimating a relative distance from the wireless device to the another device based on success or failure of transmissions to the wireless device at a given frequency and energy level;
    determining whether the relative distance is less than the distance constraint; and,
    in an instance where the relative distance is less than the distance constraint, communicating with the other different devices over the individual radio white space frequency in compliance with the distance constraint.

2. The method of claim 1, wherein the interacting comprises assuming a client role with the wireless access point.

3. The method of claim 1, wherein the interacting ceases before the functioning commences.

4. The method of claim 1, wherein the authorization is based upon a location of the wireless access point and wherein the authorization includes a first constraint that defines an energy level for broadcasting over the set of frequencies and wherein the interacting, the obtaining the authorization information, the functioning, the obtaining the individual radio white space frequency, the estimating, the determining, and the communicating are performed by the another device and wherein the method further comprises determining a relative location of the another device relative to the wireless access point and wherein the communicating is performed to account for any difference between the location of the wireless access point and the relative location of the another device.

5. The method of claim 4, wherein the authorization also includes a second constraint that defines a duration of the authorization and further comprising ceasing the communicating by an expiration of the duration.

6. One or more computer-readable storage media storing computer-readable instructions that when executed by a processor perform a method, comprising:
    functioning as a client relative to a wireless access point that is configured to obtain authorization to utilize a radio white space frequency according to a set of constraints including a distance constraint, the wireless access point obtaining authorization on behalf of a first device that lacks ability to obtain authorization to utilize the radio white space frequency;
    functioning as a Wi-Fi direct group owner to establish a Wi-Fi connection with a second device that is not the wireless access point;
    determining a relative distance from the first device to the wireless access point; and,
    in an instance where the relative distance is less than the distance constraint, transmitting data over the radio white space frequency to the second device in compliance with the set of constraints.

7. The one or more computer-readable storage media of claim 6, wherein the radio white space frequency comprises a TV white space frequency, and wherein the functioning comprises requesting the wireless access point to access a regulatory database that maps locations and associated available TV white space frequencies.

8. The one or more computer-readable storage media of claim 7, wherein the requesting comprises requesting the wireless access point to access a uniform resource identifier (URI) of the regulatory database over the Internet.

9. The one or more computer-readable storage media of claim 6, wherein the wireless access point is configured to obtain authorization based upon an ability of the wireless access point to determine a geographic location of the wireless access point and to access the Internet.

10. The one or more computer-readable storage media of claim 6, further comprising determining the relative distance to the wireless access point based upon success or failure of transmissions to the wireless access point at a given frequency and energy level.

11. The one or more computer-readable storage media of claim 10, wherein the first device lacks a capability to determine a geographic location.

12. The one or more computer-readable storage media of claim 6, wherein the set of constraints includes a duration of the authorization and further comprising obtaining a time stamp of the authorization.

13. The one or more computer-readable storage media of claim 12, further comprising tracking the transmitting relative to the time stamp and ceasing the transmitting by an end of the duration calculated from the time stamp.

14. The one or more computer-readable storage media of claim 6, wherein the client is the first device.

15. A system, comprising:
    memory and a processor configured to execute instructions stored on the memory; and,
    a communication component configured to:
        interact with a wireless access point to request that the wireless access point obtain authorization to use one or more TV white space frequencies based on a location of the wireless access point, the wireless access point obtaining authorization on behalf of a device that lacks ability to:
  obtain authorization to use the one or more TV white space frequencies, and
  determine a geographic location of the device,
operate as a Wi-Fi direct group owner to establish Wi-Fi communication with a different device, and
instruct the different device to communicate over an individual TV white space frequency.

16. The system of claim 15, wherein the system further comprises a transmitter configured to transmit at least one of 2.4 Giga Hertz frequency, 5.0 Giga Hertz frequency, TV channel frequencies, or 60 Giga Hertz frequency, and wherein the communication component is further configured to determine a relative distance between the communication component and the wireless access point based upon successful transmissions to the wireless access point at an individual frequency and a specific transmission energy.

17. The system of claim 15, wherein the authorization includes a set of constraints that comprise the location and a duration and wherein the communication component is further configured to track use of the individual TV white space frequency relative to the duration to ensure that the duration is not exceeded.

18. The system of claim 15, wherein the memory, the processor, and the communication component are embodied on a single device.

19. The system of claim 15, wherein the system includes the wireless access point or wherein the system does not include the wireless access point.

20. The system of claim 15, wherein the system is embodied on the device.

* * * * *